United States Patent
Hashimoto et al.

(10) Patent No.: US 7,896,408 B2
(45) Date of Patent: Mar. 1, 2011

(54) BUMPER STRUCTURE

(75) Inventors: Narikazu Hashimoto, Shimonoseki (JP); Tsunetake Tsuyoshi, Shimonoseki (JP); Hideki Ishitobi, Shinagawa-ku (JP); Satoshi Nimura, Shimonoseki (JP); Toru Hashimura, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/402,174

(22) Filed: Mar. 11, 2009

(65) Prior Publication Data
US 2009/0243314 A1 Oct. 1, 2009

(30) Foreign Application Priority Data
Mar. 31, 2008 (JP) .............................. 2008-093061

(51) Int. Cl.
*B60R 19/04* (2006.01)
(52) U.S. Cl. .................. 293/102; 293/120; 293/132
(58) Field of Classification Search .............. 293/102, 293/120, 132, 133, 155, 154
See application file for complete search history.

(56) References Cited

U.S. PATENT DOCUMENTS

| | | | | |
|---|---|---|---|---|
| 6,361,092 B1 * | 3/2002 | Eagle et al. | .............. | 293/102 |
| 6,688,661 B2 * | 2/2004 | Yamamoto | .............. | 293/102 |
| 7,300,080 B2 * | 11/2007 | Rebuffet et al. | .............. | 293/120 |
| 2006/0284432 A1 * | 12/2006 | Hashimoto et al. | .............. | 293/154 |

FOREIGN PATENT DOCUMENTS

| | | | |
|---|---|---|---|
| JP | 2004189062 A | * | 7/2004 |
| JP | 2004-237818 | | 8/2004 |
| JP | 2005152920 A | * | 6/2005 |
| JP | 2006110609 A | * | 4/2006 |
| JP | 2007-284039 | | 11/2007 |
| JP | 2008-37220 | | 2/2008 |
| JP | 2008037220 A | * | 2/2008 |
| JP | 2008068849 A | * | 3/2008 |

* cited by examiner

*Primary Examiner*—Patricia L Engle
*Assistant Examiner*—SunSurraye Westbrook
(74) *Attorney, Agent, or Firm*—Oblon, Spivak, McClelland, Maier & Neustadt, L.L.P.

(57) ABSTRACT

The bumper stay includes a cylindrical shaft member fit in to a hole of a bumper reinforce, a cylindrical reinforcing member fit in to the outer periphery of the shaft member in the rear side of the bumper reinforce, and a mounting flange member fit in to the outer periphery of the shaft member in its rear end. The shaft member is enlarged by electromagnetic forming and is tightly adhered to the inner peripheral surface of the hole formed in the bumper reinforce, the inner peripheral surface of the reinforcing member, and the inner peripheral surface of the hole flange formed in the mounting flange member, thereby these are joined with each other. Thin aluminum alloy extruded material can be used for the shaft member. With such configuration, when a bumper stay is fit in to the holes formed in the front and rear walls of the bumper reinforce and the bumper stay is enlarged by electromagnetic forming to join with the bumper reinforce, joining of the both can be firmly performed and sufficient strength and energy absorption quantity can be secured.

11 Claims, 8 Drawing Sheets

BUMPER STRUCTURE

BACKGROUND OF THE INVENTION

1. Field of the Invention

The present invention relates to a bumper structure for an automobile formed by integrating a bumper reinforce and a bumper stay.

2. Description of the Related Art

In the inside of a bumper installed in the front end and rear end of a body of an automobile of a passenger car and truck and the like, a bumper reinforce is arranged as a reinforcing member. Generally, the bumper reinforce is a member of a hollow section including a front wall and rear wall facing generally perpendicularly to the loading direction and a plurality of lateral walls connecting the front wall and the rear wall, wherein both ends are supported by a pair of bumper stays and the rear end of respective stay is fixed to the front end of a (front or rear) side member.

Also, in the present specification, the collision face side is referred to as "front" and the vehicle body side is referred to as "rear", regardless of the front side or rear side of the vehicle.

The bumper structure including such a bumper reinforce and bumper stays, wherein holes penetrating the front wall and rear wall in the vehicle longitudinal direction are formed in both end parts of the bumper reinforce, cylindrical shaft members of aluminum alloy are fit in to the holes, the shaft members are enlarged by electromagnetic forming to be tightly adhered to the inner peripheral surface of the holes and are extended toward the outer diameter direction between the front wall and rear wall, thereby the bumper reinforce and the shaft members (bumper stays) are fixed, is known by, for example, the Japanese Published Unexamined Patent Application No. 2004-237818, the Japanese Published Unexamined Patent Application No. 2007-284039, and the Japanese Published Unexamined Patent Application No. 2008-037220.

SUMMARY OF THE INVENTION

This bumper structure has an advantage of superiority in energy absorption characteristic because the bumper reinforce and bumper stays are securely joined and the length in the axial direction of the bumper stay deformed like a bellows in collision from the front can be made long.

On the other hand, in order that the shaft members are enlarged by electromagnetic forming to be tightly adhered to the inner peripheral surface of the holes formed in the bumper reinforce and are extended toward the outer diameter direction between the front wall and rear wall, it is preferable that the shaft members are excellent in formability in electromagnetic forming. More specifically, the shaft member with high conductivity and not so high strength (low material strength or small thickness) is preferable, however such material may not be able to stand high collision load because the strength is not enough and energy absorption characteristic may be low. In particular, in the barrier test of IIHS (Insurance Institute of Highway Safety) proposed in recent years, a barrier is stipulated so that the impact offset to the upper side of the center of a bumper which is long in the vehicle width direction is applied to cope with a vehicle of high vehicle height such as a SUV, and it is difficult to satisfy the required strength against the offset load applied then. On the contrary, if a high strength shaft member is used in order to satisfy the required strength, enlargement by electromagnetic forming becomes insufficient and a problem may possibly occur in joining with the bumper reinforce.

The purpose of the present invention is to obtain a bumper structure wherein, in obtaining the bumper structure by fitting a shaft member into a hole formed in the front and rear walls of a bumper reinforce, enlarging the shaft member by electromagnetic forming and thereby fixing the bumper reinforce and the shaft members (bumper stays), a problem of electromagnetic forming does not occur in fixing both, while the strength to stand the strong collision load is acquired and required energy absorption quantity can be secured.

The bumper structure according to one aspect of the present invention is directed to a bumper structure including: a bumper reinforce formed of metal shape material with a hollow cross section, the bumper reinforce having a front wall, rear wall and a plurality of lateral walls connecting the front wall and the real wall and being formed with holes penetrating the front wall and rear wall in the vehicle longitudinal direction in both end parts of the bumper reinforce; and cylindrical bumper stays fixed to both end parts of the bumper reinforce, the bumper stays including cylindrical shaft members of aluminum alloy fit in to the holes of the bumper reinforce and cylindrical reinforcing members fit to the outer periphery of the shaft members in the vehicle body side of the bumper reinforce, the shaft members being enlarged by electromagnetic forming and adheringly fixed to the inner peripheral surface of the holes of the front wall and the rear wall of the bumper reinforce and the inner peripheral surface of the reinforcing members.

The bumper stay generally includes a mounting flange in its rear end for fixing it to the edge of a side member of a vehicle body frame. The mounting flange may be formed of the shaft member itself, or may be another member fixed to the rear end of the shaft member. In the latter case, the another member is a plate-like mounting flange member formed with a hole, the rear end part of the shaft member is fit in to the inside of the hole, and the shaft member is enlarged by electromagnetic forming and adheringly fixed to the inner peripheral surface of the hole. This hole may be a simple perforated hole, but is preferable to be, for example, a hole of a cylindrical hole flange formed by a burring process (burring hole) because the area of the inner peripheral surface is large. The hole flange protrudes toward the front side (the burring process is performed from the rear side), the rear end part of the shaft member is fit in to the inside of the hole flange, and the shaft member is enlarged by the electromagnetic forming and is adheringly fixed to the inner peripheral surface of the hole flange. It is preferable that the rear end part of the reinforcing member is fit to the outer periphery of the hole flange of the flange member and the cylindrical hole flange is in the state of being sandwiched from inside and outside by the shaft member and reinforcing member.

The reinforcing member is formed of, for example, aluminum alloy extruded shape material, and has a cylindrical part fit to the outer periphery of the shaft member and a rib protruding toward its outer periphery side. This rib is formed mainly in the position where an offset load is likely to be applied to proceed with deformation. For example, when a barrier is assumed wherein the impact offset toward the upper side of the center of a bumper is applied like in the barrier test of the IIHS, it is preferable to form the rib in a position offset toward the upper side or toward the center side in the vehicle width direction of the reinforcing member. In order to satisfy the required strength, this rib may be formed by one or a plural number and may have a cylindrical cross section.

The length of the rib in the longitudinal direction may not only be same with the length of the cylindrical section of the main body but may be formed shorter than it depending on which kind of load-displacement curve is assumed in the vertical collapsing (which kind of strength variation is caused against displacement).

As a typical configuration of the reinforcing member, its rear end is abutted to the outer periphery (specifically the large diameter part, for example) of the hole flange, and/or its front end is abutted to the rear wall of the bumper reinforce. Also, the diameter of the inner peripheral surface of the reinforcing member is preferably larger than the diameter of the hole in the rear wall of the bumper reinforce.

In accordance with the aspect of the present invention, it is possible to obtain a bumper structure wherein, in obtaining the bumper structure by fitting a shaft member into a hole formed in the front and rear walls of a bumper reinforce, enlarging the shaft member by electromagnetic forming thereby fixing the bumper reinforce and the shaft members (bumper stays), a problem of electromagnetic forming does not occur in fixing both, while the strength to stand the strong collision load is acquired and required energy absorption quantity can be secured.

BRIEF DESCRIPTION OF THE DRAWINGS

The above and other objects, features and advantages of the present invention will become apparent from the following description taken in connection with the accompanying drawings, in which.

DESCRIPTION OF THE PREFERRED EMBODIMENTS

The bumper structure according to an embodiment of the present invention will be described below in more detail referring to FIG. 1-FIG. 10.

Figure 1:
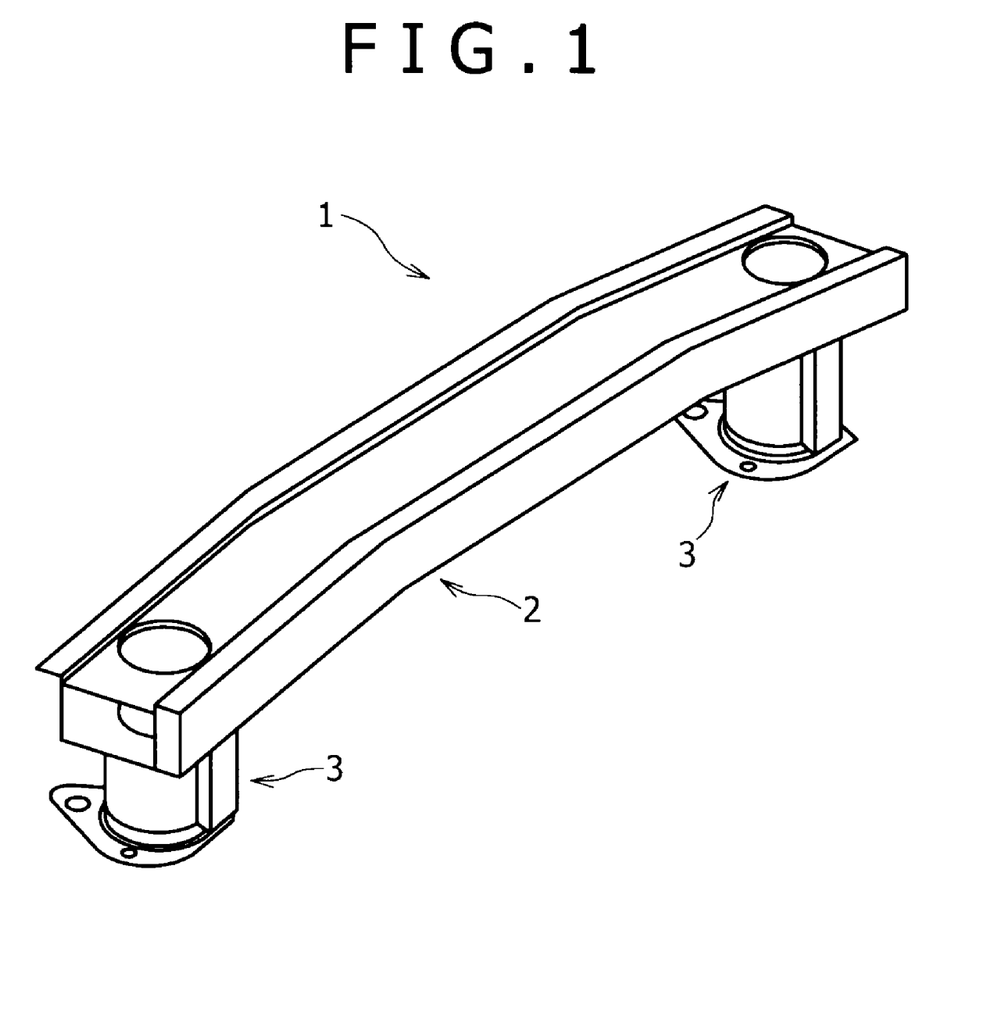
FIG. 1 is an overall perspective view of the bumper structure according to an embodiment of the present invention.

FIG. 1 is a perspective view of an entire bumper structure 1 according to an embodiment of the present invention. This bumper structure 1 is constituted of a bumper reinforce 2 formed by bending aluminum alloy extruded shape material having a hollow cross section with both end parts slanted toward the vehicle body side, and cylindrical bumper stays 3 made of an aluminum alloy fixed to both end parts (slanted portions) of the bumper reinforce with the axial direction directed in the vehicle body longitudinal direction.

Figure 2:
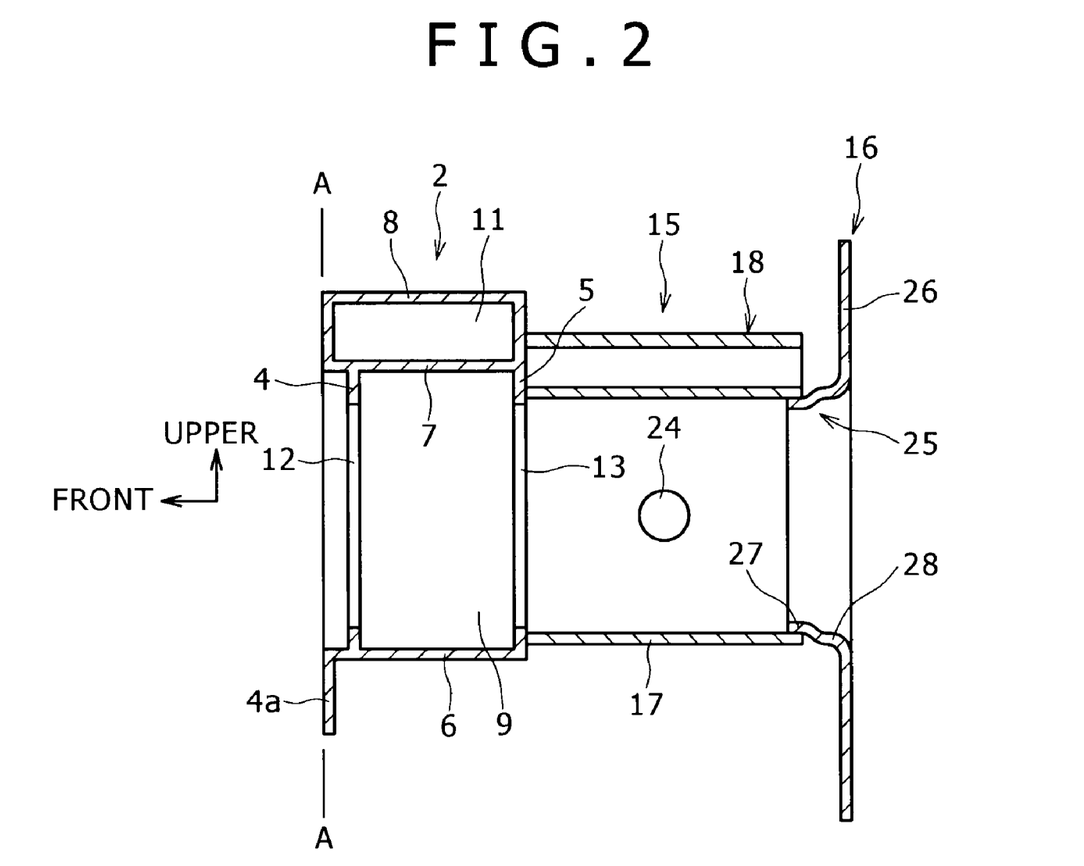
FIG. 2 is a cross-sectional view of the bumper stay section (exclusive of the shaft member) of the bumper structure before electromagnetic forming.

As shown in FIG. 2, the bumper reinforce 2 includes a front wall 4 and a rear wall 5 generally perpendicular to the vehicle body longitudinal direction and three lateral walls 6 to 8 connecting the front wall 4 and the rear wall 5 and being directed in the vehicle body longitudinal direction, wherein the front wall 4, rear wall 5 and lateral walls 6, 7 constitute a main chamber 9 with a rectangular cross section, and the front wall 4, rear wall 5 and lateral walls 7, 8 constitute a small chamber 11 with a rectangular cross section in the upper side of the main chamber 9. The front wall 4 retracts in the portion of the main chamber 9 to form a step and includes a flange 4a downwardly protruding from the main chamber 9, and out of the front wall 4, the portion constituting the small chamber 11 and the flange 4a form a collision face A. Holes 12, 13 penetrating through the front wall 4 and rear wall 5 in the vehicle body longitudinal direction are formed in the portion of the main chamber 9.

Figure 3:
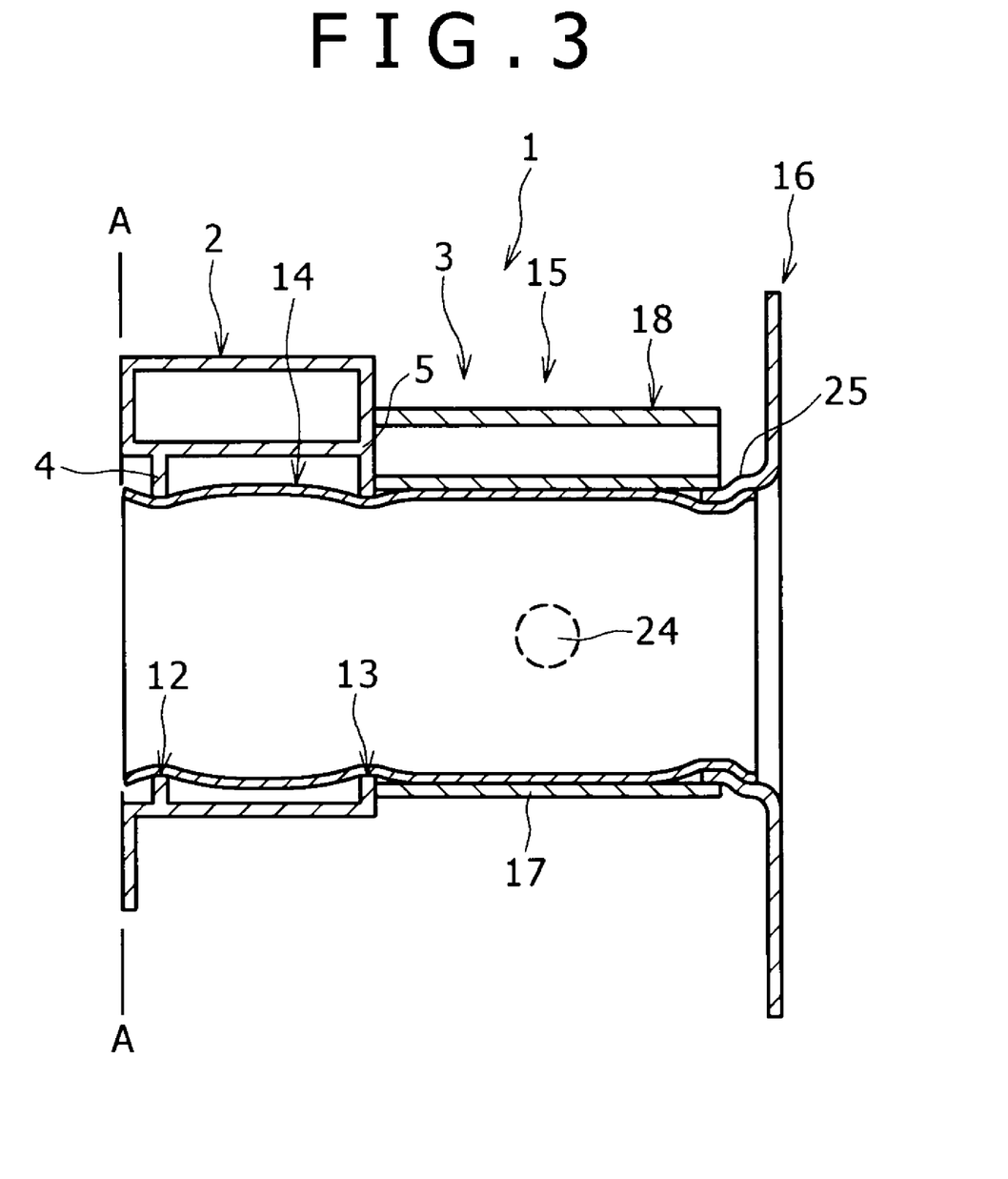
FIG. 3 is a cross-sectional view of the same after electromagnetic forming.

As shown in FIG. 3, the bumper stay 3 includes a cylindrical shaft member 14 whose front part is fit in to the holes 12, 13 of the bumper reinforce 2, a cylindrical reinforcing member 15 fit to the outer periphery of the shaft member 14 in the vehicle body side of the bumper reinforce 2, and a mounting flange member 16 arranged in the rear end of the shaft member, and, as described below, these are fixed with each other by enlarging the shaft member 14 by electromagnetic formation and the shaft member 14 is fixed with the bumper reinforce 2. The shaft member 14 and the reinforcing member 15 are of aluminum alloy extruded shape material, and the mounting flange member 16 is formed of an aluminum alloy sheet.

Figure 4A:
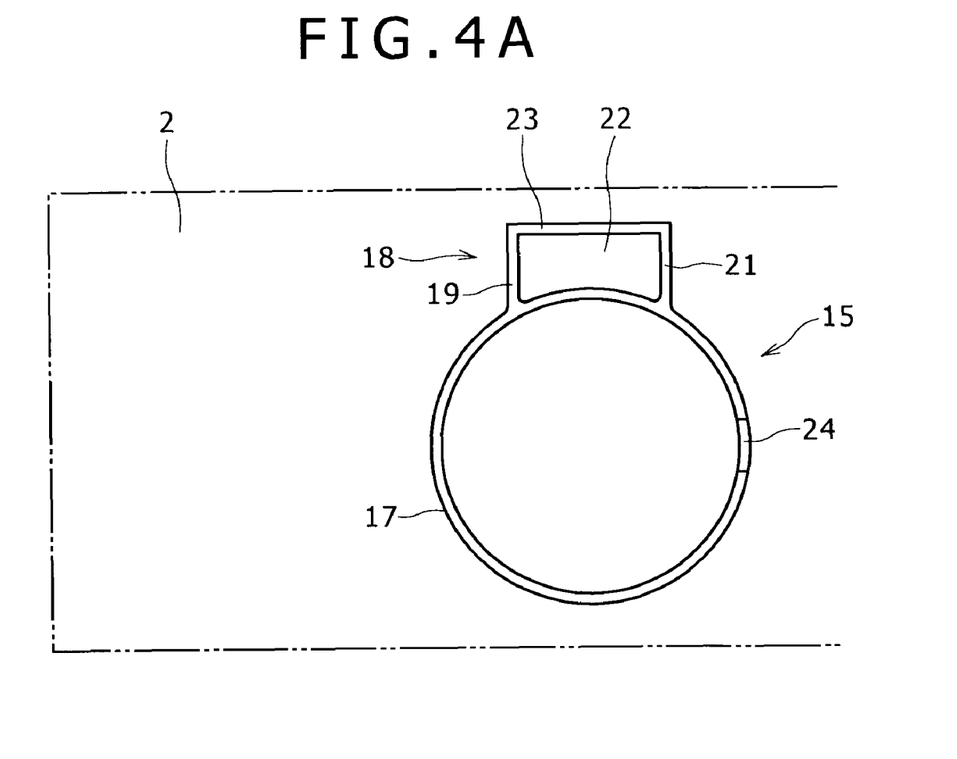
FIG. 4A is an elevation view and FIG. 4B is a plan view of the reinforcing member of the bumper stay of the bumper structure.
Figure 4B:
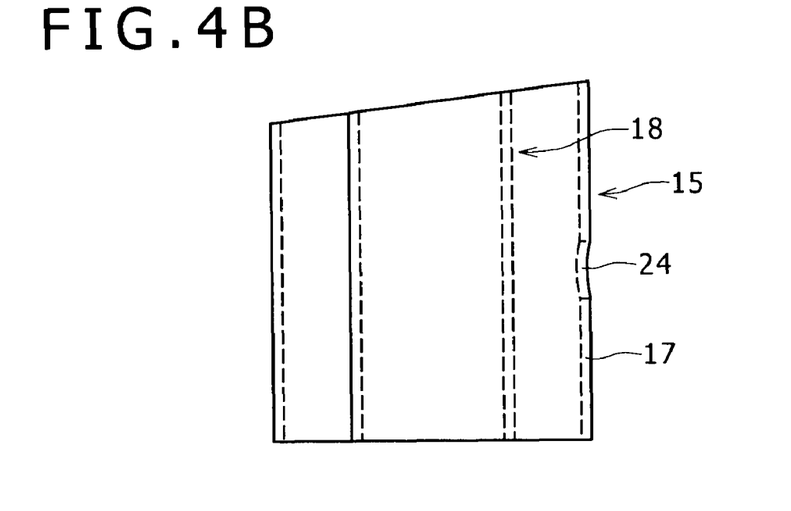

As shown in FIGS. 4A and 4B, the reinforcing member 15 includes a cylinder-shaped cylindrical part 17 which is a main body and a hollow rib 18 extending upwardly therefrom, the hollow rib 18 including two plate-like ribs 19, 21 upwardly extruding from the cylindrical part 17 and an upper wall 23 connecting the upper ends of both plate-like ribs 19, 21 generally horizontally and constituting a hollow small chamber 22 along with a part of the cylindrical part 17. The reinforcing member 15 is formed by perpendicularly cutting an aluminum alloy extruded shape material at one end and by obliquely cutting it to match the inclination of both ends of the bumper reinforce 2 at another end, and a hole 24 is formed in the vicinity of the center of the cylindrical part 17 in the longitudinal direction. Also, the inner diameter of the cylindrical part 17 is set larger than the inner diameter of the holes 12, 13 formed in the bumper reinforce 2.

As shown in FIG. 2, the mounting flange member 16 is formed by a cylindrical hole flange 25 by performing a burring process on an aluminum alloy sheet, the periphery of the hole flange 25 including a sheet flange 26 which is fixed to the front end of the side member not shown by bolts and the like. The hole flange 25 protrudes toward the front from the sheet flange 26 and includes a small diameter part 27 in the front side and a large diameter part 28 in the rear side continuing thereto, and a step part is formed between both. The outer diameter of the small diameter part 27 of the hole flange 26 is slightly smaller than the inner diameter of the cylindrical part 17 of the reinforcing member 15, the outer diameter of the large diameter part 28 is larger than the inner diameter of the cylindrical part 17, the small diameter part 27 is fit in to the inside of the cylindrical part 17, and the rear end of the cylindrical part 17 is abutted to the step part of the large diameter part 28.

In the stage of raw material (shaft raw material) before electromagnetic forming, the shaft member 14 is formed by perpendicularly cutting a cylinder-shaped aluminum alloy extruded shape material at one end and by obliquely cutting it to match the inclination of both ends of the bumper reinforce 2 at another end. The outer diameter of the shaft raw material is set slightly smaller than the inner diameter of the holes 12, 13 formed in the front wall 4 and the rear wall 5 of the bumper reinforce 2 and the inner diameter of the small diameter part 27 of the hole flange 25 of the mounting flange member 16.

As shown in FIG. 2, in electromagnetic forming, the front end of the reinforcing member 15 is abutted to the rear wall of the bumper reinforce 2, and the small diameter part 27 of the hole flange 25 of the mounting flange 16 is fit in to the rear end of the reinforcing member 15. At this time, the orientation around the axis of the reinforcing member 15 and the mounting flange 16 is matched to the vertical direction of the bumper reinforce 2. Supplemental joining by welding and the like may be performed between the bumper reinforce 2 and the reinforcing member 15 and between the reinforcing member 15 and the mounting flange 16.

Then, as is self-explanatory from FIG. 3, the shaft raw material is fit in to the holes 12, 13 formed in the front wall 4 and the rear wall 5 of the bumper reinforce 2, and the front end is protruded from the hole 12 slightly. Then the length of the shaft raw material is set so that the rear end goes beyond the step part of the hole flange 25 of the mounting flange 16 but does not protrude from the rear end of the hole flange 25.

When the shaft raw material is enlarged by electromagnetic forming, the raw material becomes the shaft member 14. By enlarging, the shaft member 14 is tightly adhered to the inner peripheral surface of the holes 12, 13 formed in the front wall 4 and the rear wall 5 of the bumper reinforce 2, its front end protruding toward the front from the front wall 4 and enlarged toward the outer diameter direction, and is extended toward the outer diameter direction between the front wall 4 and the rear wall 5. The front end of the shaft member 14 is positioned on the same plane with the collision face A or in the rear side of the collision face A. Further, the shaft member 14 is tightly adhered to the inner peripheral surface of the hole flange 25 of the mounting flange member 16, the rear side being enlarged toward the outer diameter direction along the inner peripheral surface, is extended toward the outer diameter direction between the rear wall 5 of the bumper reinforce 2 and the hole flange 25 of the mounting flange member 16, is tightly adhered to the inner peripheral surface of the cylindrical part 17 of the reinforcing member 15, and is extended to the inside of the hole 24 formed in the cylindrical part 17.

By this electromagnetic forming, the shaft member 14 is fixed with respect to the bumper reinforce 2, and the reinforcing member 15 and the mounting flange member 16 are connected to the shaft member 14 to form the bumper stay 3, thereby the bumper structure 1 is formed. More specifically, because the shaft member 14 is tightly adhered to the inner peripheral surface of the holes 12, 13 formed in the front wall 4 and the rear wall 5 of the bumper reinforce 2 and is extended toward the outer diameter direction in the front and rear side of the front wall 4 and the front and rear side of the rear wall 5, the shaft member 14 is fixed with respect to the bumper reinforce 2. Also, because the shaft member 14 is tightly adhered to the inner peripheral surface of the reinforcing member 15, the front end of the reinforcing member 15 is abutted to the rear wall 5 of the bumper reinforce 2, and the rear end is supported by the step part of the large diameter part 28 of the hole flange 25 of the mounting flange member 16, the reinforcing member 15 is fixed to the shaft member 14. Further, because the shaft member 14 is tightly adhered to the inner peripheral surface of the hole flange 25 of the mounting flange member 16, is extended toward the outer diameter direction in the front and rear side of the small diameter part 27 of the hole flange 25, and the hole flange 25 is held between the shaft member 14 and the reinforcing member 15, the mounting flange member 16 is fixed to the shaft member 14. On the other hand, because a part of the shaft member 14 is extended into the hole 24 formed in the reinforcing member 15, stopping the relative rotation between the shaft member 14 and the reinforcing member 15 is ensured. Also, supplemental joining by welding and the like may be possible between the shaft member 14 and the bumper reinforce 2 and between the shaft member 14 and the mounting flange 16.

Because the shaft member 14 of the bumper stay 3 is reinforced by the reinforcing member 15, even if pipe raw material with not so high strength and easy in enlarging by electromagnetic forming (material with low material strength, thin material) is used for the shaft member 14, the bumper structure 1 can secure the strength required for the bumper stay 3. Because the reinforcing member 15 has no problem in electromagnetic forming (electromagnetic forming is not necessary), material satisfying the required strength and absorption energy quantity in collision (material with high material strength, thick material) can be suitably used. Also, by the use of pipe raw material excellent in electromagnetic forming characteristic for the shaft member 14, enlarging by electromagnetic forming is performed sufficiently, thereby joining of the shaft member 14 to the bumper reinforce 2 and joining of the reinforcing member 15, the mounting flange member 16 and the shaft member 14 are securely performed, the power applied to the coil for electromagnetic forming can be decreased, and the life of the coil for electromagnetic forming can be prolonged.

Further, in a conventional bumper structure without the reinforcing member, the strength of the shaft member was the strength of the bumper stay, therefore, in order to obtain the required strength as the bumper stay (the strength against the offset load, in particular), pipe raw material with comparatively high strength must have been be used, and it was possible that joining became uncertain because of lowering of electromagnetic forming characteristic or the life of the coil for electromagnetic forming was shortened.

The bumper stay 3 described above is the so-called vertical collapsing type stay, and when a heavy collision load is applied to the collision face A of the bumper reinforce 2, the shaft member 14, and the cylindrical part 17 and the hollow rib 18 of the reinforcing member 15 vertically collapse and absorb the collision energy.

In the bumper stay 3, although the rear end of the cylindrical part 17 of the reinforcing member 15 is abutted to the outer periphery of the hole flange 25 of the mounting flange member 16 (the step part of the large diameter part 28) and is supported securely, depending on the relative dimension between the inner diameter of the cylindrical part 17 and the outer diameter of the large diameter part 28 of the hole flange 25, the load applied to the reinforcing member 15 in collision is not supported sufficiently by the outer periphery of the hole flange 25 therefore it is also possible that the reacting load by the reinforcing member 15 hardly occurs in the initial stage of the collision, and that a heavy reacting load occurs at the time the reinforcing member 15 retracts and its rear end abuts to the sheet flange 26. In this case, the magnitude of the reaction load corresponding to the displacement (refer to the load-displacement curve in FIG. 7) in vertical collapsing of the bumper stay 3 changes in stages. This point is similar to the cases shown in FIGS. 5, 6 described below.

The bumper structure 1 is adapted to the offset load applied in the barrier test of IIHS described previously, and even if the offset load is applied, the torsional deformation of the bumper reinforce 2 and the bumper stay is prevented and the bumper stay 3 vertically collapses stably.

When the offset load is applied to the upper part of the center of the bumper reinforce, and if the bumper reinforce is a common one without the small chamber 11 (with a simple cross-section of the squared O-shape, for example), the lateral wall 7 in the upper side is easily coallapsingly deformed preferentially by the offset load, however, in the case of the bumper reinforce 2 of the present invention formed with the small chamber 11, the offset collapsing of the lateral walls 7, 8 is prevented because two lateral walls 7, 8 counter the offset load. Also, if the hollow rib 18 is not formed in the reinforcing member 15, the upper portion of the cylindrical part of the bumper stay is easily collapsingly deformed preferentially by the offset load, however, in the case of the bumper stay 3 of the present invention having the hollow rib 18, the hollow rib 18 supports the load between the bumper reinforce 2 and the mounting flange member 16, and the offset collapsing of the cylindrical parts (the shaft member 14 and the cylindrical part 17 of the reinforcing member 15) is prevented. As the result that the offset collapsing of the bumper reinforce 2 and the bumper stay 3 is thus prevented, even if the offset load described above is applied, occurrence of the torsional deformation for each is prevented, and the vertical collapsing occurs stably.

Next, variations of the bumper structure 1 shown FIG. 1 to FIGS. 4A and 4B will be described referring to FIG. 5 to FIG. 10 (for the part substantially same with that of the bumper structure 1 shown in FIG. 1 to FIGS. 4A and 4B, same number is given).

Figure 5:
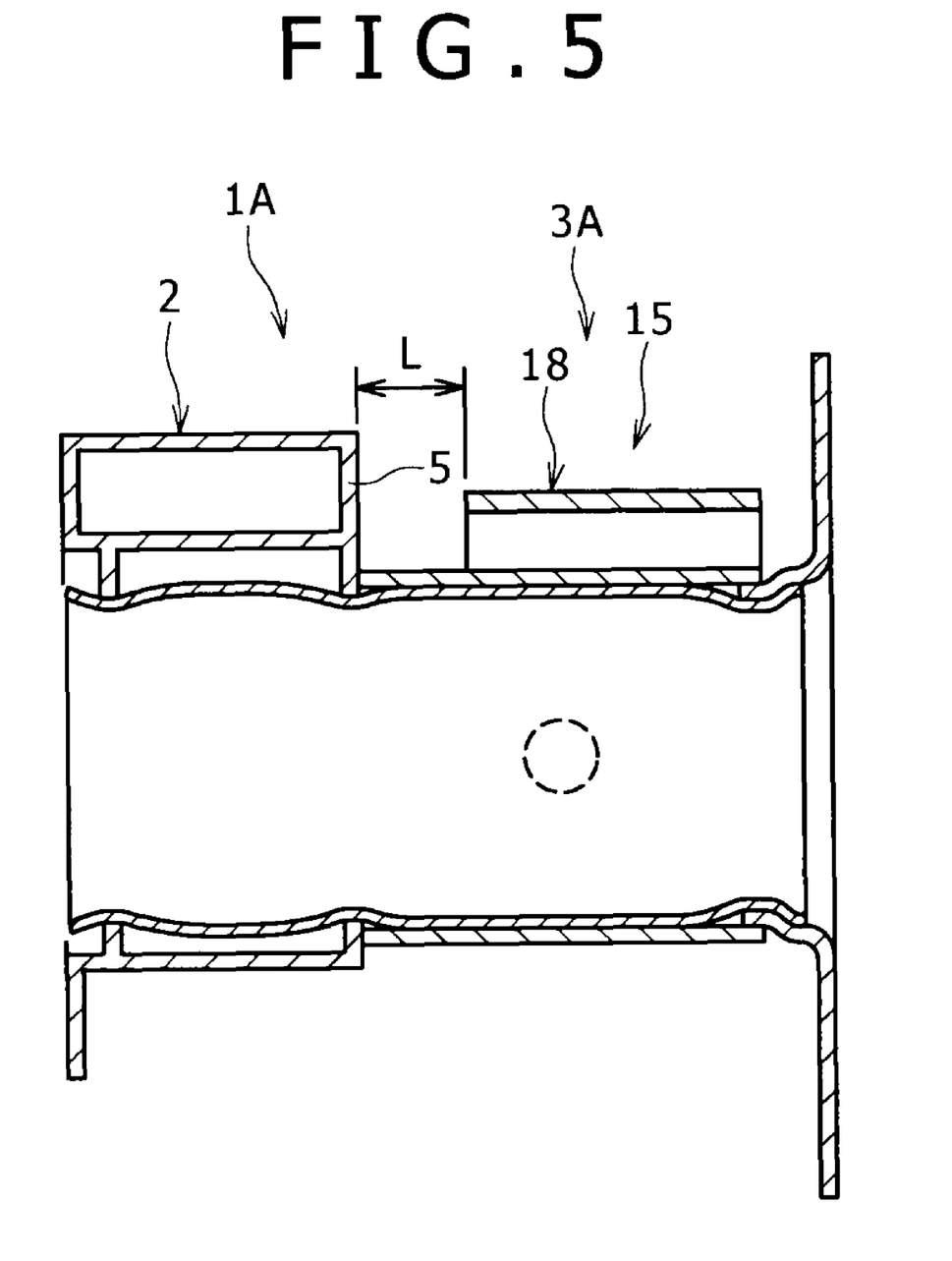
FIG. 5 is a cross-sectional view of the bumper stay section of another bumper structure according to an embodiment of the present invention.
Figure 6:
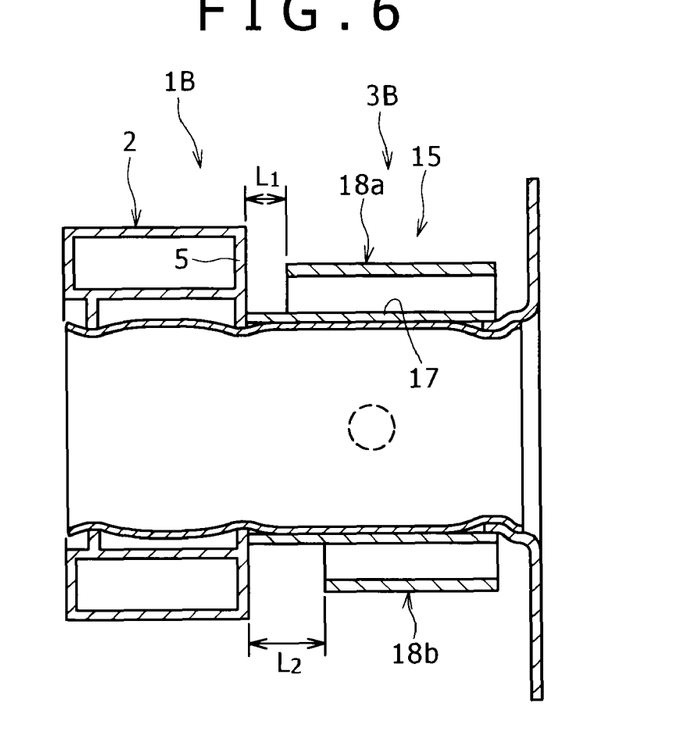
FIG. 6 is a cross-sectional view of the bumper stay section of another bumper structure according to an embodiment of the present invention.

In the bumper stay 3A of the bumper structure 1 shown in FIG. 5, a part of the front side of the hollow rib 18 of the reinforcing member 15 is cut off, and a gap (distance L) is formed between the front end of the hollow rib 18 and the rear wall 5 of the bumper reinforce 2. Also, in the bumper stay 3B of the bumper structure 1 shown in FIG. 6, hollow ribs 18a, 18b are formed above and beneath the cylindrical part 17 of the reinforcing member 15, parts of the front side of the hollow ribs 18a, 18b are cut off, and gaps are formed between the front end of the hollow ribs 18a, 18b and the rear wall 5 of the bumper reinforce 2 (distance L1, L2, (L2≧L1)).

Figure 7:
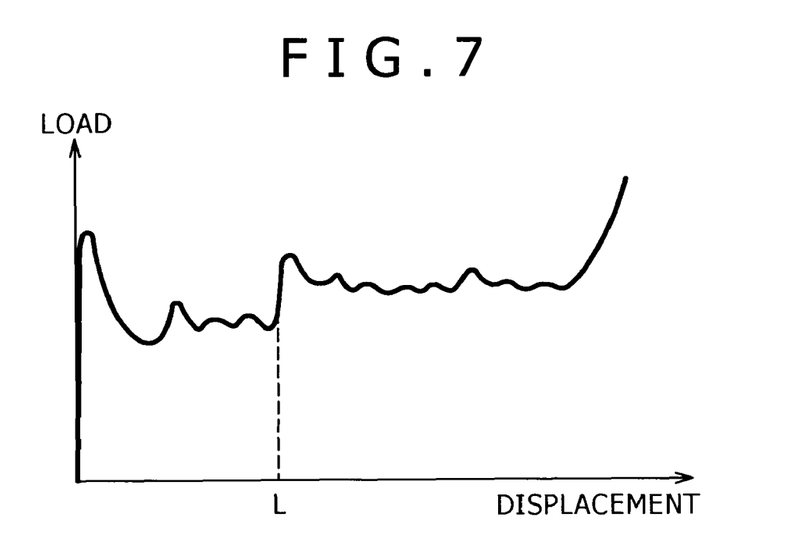
FIG. 7 is a schematic drawing of a load-displacement curve in the vertical collapsing of the bumper stay of the bumper structure shown in FIG. 5.

In the bumper stay 3 shown in FIG. 3, when the collision load is applied and the shaft member 14 and the reinforcing member 15 vertically collapse, the shaft member 14 and the reinforcing member 15 (the cylindrical part 17 and the hollow rib 18) start collapsing at practically the same time, however, in the bumper stay 3A, the shaft member 14 and the cylindrical part 17 preferentially collapse in the part of the gap where there is no hollow rib 18, and after collapsing by a predetermined quantity (distance L), the hollow rib 18 also starts collapsing. In the bumper stay 3B, the shaft member 14 and the cylindrical part 17 preferentially collapse in the parts of the gaps where there is no hollow ribs 18a, 18b, and after collapsing by a predetermined quantity (distance L1), the hollow rib 18a starts collapsing, and after collapsing further by a predetermined quantity (distance L2-L1), the hollow rib 18b also starts collapsing. By adjusting the length of the hollow rib 18 (or the hollow ribs 18a, 18b) thus, the magnitude of the reaction load with respect to the displacement in vertical collapsing of the bumper stay can be changed in stages. FIG. 7 is a schematic drawing of a load-displacement curve in vertical collapsing of the bumper stay 3A, and shows the manner the load increases in stages when the displacement reaches L.

Figure 8A:
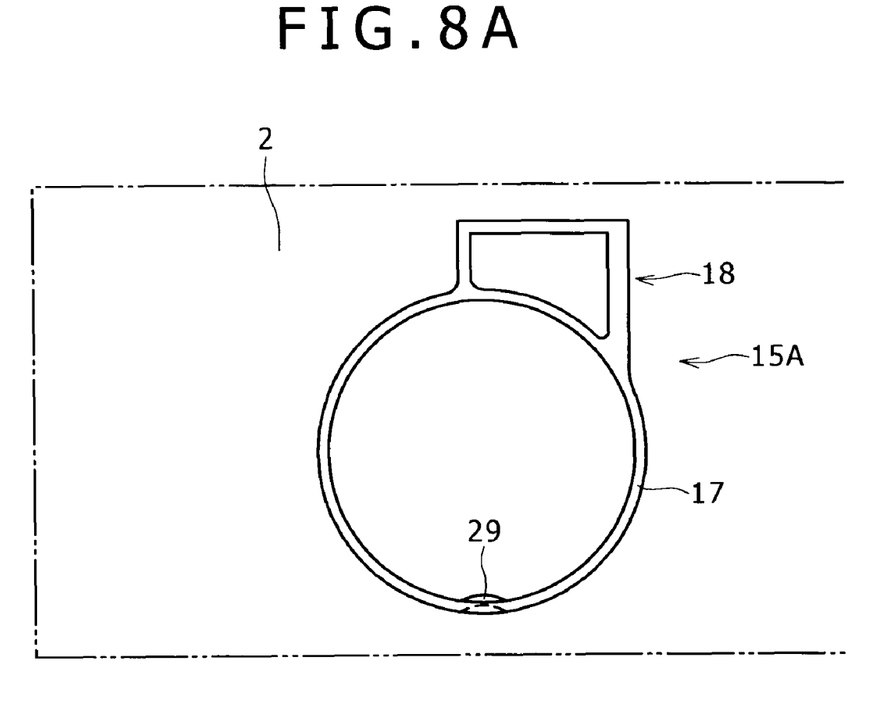
FIG. 8A is an elevation view and FIG. 8B is a plan view of another reinforcing member according to an embodiment of the present invention.
Figure 8B:
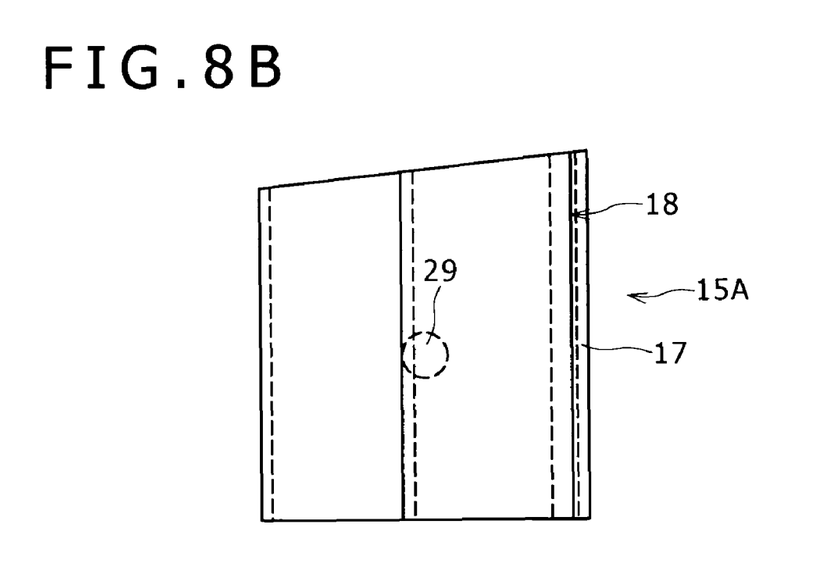

In the reinforcing member 15A shown in FIGS. 8A and 8B, the hollow rib 18 is positioned not in just above the cylindrical part 17 but offset to the inner side in the vehicle width direction, and a projection 29 facing inner periphery side is formed in the vicinity of the center in the longitudinal direction of the cylindrical part 17.

The reason of providing the hollow rib 18 in a position offset to the inner side in the vehicle width direction as described above is to cope with the offset load applied in the inner side of the bumper stay 3. This is because the collision load is applied mostly between the bumper stay 3, 3 in both ends of the bumper reinforce in the collision with the barrier (in the barrier test of the IIHS also, the barrier hits the center of the bumper reinforce in the width direction), and the offset load is applied in the inner side of the stay in that case.

Like the hole 24, the projection 29 is formed for stopping the relative rotation of the shaft member 14 and the reinforcing member 15. The projection 29 and the extended shaft member 14 interfere and stop the relative rotation with each other.

Figure 9:
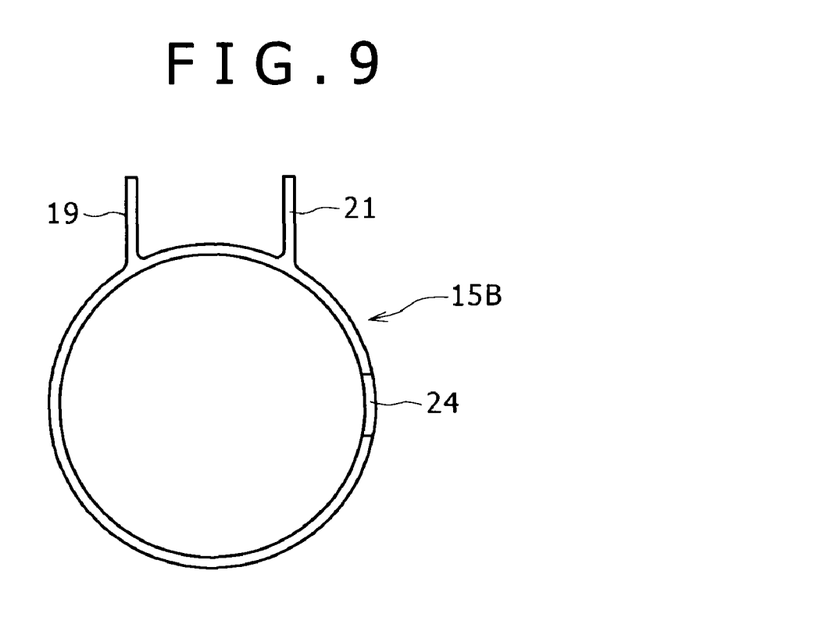
FIG. 9 is an elevation view of another reinforcing member according to an embodiment of the present invention.

In the reinforcing member 15B shown in FIG. 9, only the simple plate-like ribs 19, 21 are formed in stead of the hollow rib. According to the assumed magnitude of the offset load, such plate-like ribs 19, 21 can be formed in one or a plural number of sheets.

Figure 10:
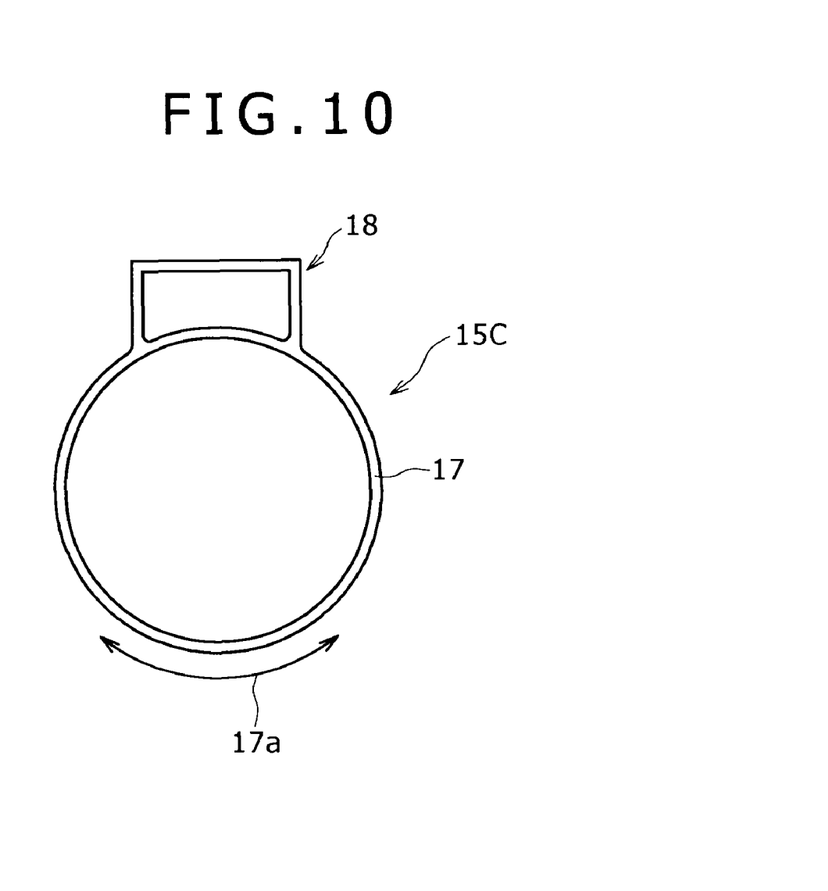
FIG. 10 is an elevation view of another reinforcing member according to an embodiment of the present invention.

In the reinforcing member 15C shown in FIG. 10, the cylindrical part 17 is not circular, but the curvature of an arc of the lower portion 17a is formed smaller than that of the other portion. The reason of forming the cylindrical part 17 (particularly the inner periphery side) in such non-circular shape is to stop the relative rotation of the shaft member 14 and the reinforcing member 15C. The outer peripheral face of the shaft member 14 extended along the shape of the inner peripheral face of the cylindrical part 17 and the inner peripheral face of the cylindrical part 17 interfere and stop the relative rotation with each other.

Further, the bumper structure according to an embodiment of the present invention can include a variety of embodiments as exhibited below in addition to the examples illustrated in FIG. 1 to FIG. 10.

(1) Although, in the example described above, the small chamber 11 is arranged in the upper side of the bumper reinforce and the flange 4a is arranged in the lower side (refer to FIG. 2), depending on the magnitude of the offset load assumed (inclusive of the case the offset load is not assumed) and the position of collision assumed, the type the small chamber 11 and/or the flange 4a are not included, the type the small chamber is provided in the lower side, and the type the small chambers are provided in both the upper side and lower side, are also be possible.

(2) Although, in the example described above, considering the safety against a pedestrian, the step is provided in the front wall 4 of the bumper reinforce (refer to FIG. 3) and the front end of the shaft member 14 protruding slightly from the front wall 4 is positioned on the same plane with the collision face A or in the rear side of the collision face A, the type wherein the step is not arranged in the front wall 4 and the front end of the shaft member 14 is protruded from the collision face, the type wherein the step is not arranged in the front wall 4 and the front end of the shaft member 14 is not protruded toward the front from the hole 12, and the type wherein, even if the step is provided, the front end of the shaft member 14 protrudes toward the front side from the collision face A are also be possible.

(3) Although, in the examples described above, the ribs for reinforcing are arranged in the upper side (refer to FIGS. 4A and 4B), in the position of the inner side of the upper side (refer to FIGS. 8A and 8B), and both the upper side and lower side (refer to FIG. 6) of the reinforcing member 15, depending on the magnitude of the offset load assumed (inclusive of the case the offset load is not assumed) and the position of collision assumed, the type the rib is not provided or the type the rib is arranged in other position(s) is also possible.

(4) Although, in the examples described above, the rear end of the reinforcing member 15 is abutted to the outer periphery (the step part of the large diameter part 28) of the hole flange 25 of the mounting flange member 16 (refer to FIG. 3), it is also possible to be abutted directly to the sheet flange 26. In this case, the load applied to the reinforcing member 15 is supported by the sheet flange 26 from the initial stage of the collision, and a large reaction load by the reinforcing member 15 occurs.

(5) Although, in the example described above, the mounting flange member 16 formed with the cylindrical hole flange 25 by a burring process is used for mounting to the side member, as far as the cylindrical hole flange is formed, it is not necessary to be formed by the burring process, and it is not imperative that the hole flange 25 has the step part (includes the small diameter part 27 and the large diameter part 28). Furthermore, a mounting flange member formed with a simple perforated hole can be used in stead of the hole flange 25 (refer to the Japanese Published Unexamined Patent Application No. 2006-110609, for example).

(6) Because the reinforcing member 15 is not the object of electromagnetic forming, its material is not limited to aluminum alloy. It may be, for example, steel also.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A bumper structure to be mounted to a vehicle, comprising:
    a bumper reinforce formed of metal material with a hollow cross section elongated in a direction transverse to the vehicle longitudinal direction, said bumper reinforce having a front wall, a rear wall and a plurality of lateral walls connecting said front wall and said rear wall to provide said hollow cross section, further comprising holes penetrating said front wall and said rear wall in at least one portion of said bumper reinforce in the direction of elongation of the bumper reinforce; and
    cylindrical bumper stays fixed to said bumper reinforce, said bumper stays comprising cylindrical shaft members of aluminum alloy and having cylinder axes extending in the vehicle elongation direction, said bumper stays being fit in said holes of said bumper reinforce, and cylindrical reinforcing members fit to the outer periphery of said shaft members at the vehicle body side of said bumper reinforce, said shaft members being enlarged by electromagnetic forming and adheringly fixed to the inner peripheral surface of said holes of said front wall and said rear wall of said bumper reinforce and the inner peripheral surface of said cylindrical reinforcing members.

2. The bumper structure as set forth in claim 1, wherein said bumper stay comprises a plate shaped mounting flange member, a hole is formed in said mounting flange member, the rear end part of said shaft member is fit in to the inside of said hole, and the shaft member is enlarged by electromagnetic forming and is adheringly fixed to the inner peripheral surface of said hole.

3. The bumper structure as set forth in claim 1, wherein said bumper stay comprises a plate shaped mounting flange member formed with a cylindrical hole flange, said hole flange extrudes toward the front, the rear end part of said shaft member is fit in to the inside of said hole flange, and said shaft member is enlarged by electromagnetic forming and is adheringly fixed to the inner peripheral surface of said hole flange.

4. The bumper structure as set forth in claim 3, wherein said hole flange is formed by a burring process.

5. The bumper structure as set forth in claim 3, wherein the rear end part of said reinforcing member is fit in to the outer periphery of said hole flange of said mounting flange member.

6. The bumper structure as set forth in claim 3, wherein the rear end of said reinforcing member is abutted to the outer periphery of the hole flange of said mounting flange member.

7. The bumper structure as set forth in claim 1, wherein the front end of said reinforcing member is abutted to the rear wall of said bumper stay.

8. The bumper structure as set forth in claim 7, wherein the diameter of the inner peripheral surface of said reinforcing member is larger than the diameter of said rear wall of said bumper reinforce.

9. The bumper structure as set forth in claim 1, wherein said reinforcing member comprises a cylindrical part fitting in to the outer periphery of said shaft member and a rib protruding toward its outer periphery side.

10. The bumper structure as set forth in claim 9, wherein the rib of said reinforcing member is formed shorter than the length of said cylindrical part.

11. The bumper structure as set forth in claim 1, wherein said reinforcing member is formed of an aluminum alloy extruded shape material.

* * * * *